United States Patent [19]
Richardson, III et al.

[11] Patent Number: 5,306,343
[45] Date of Patent: Apr. 26, 1994

[54] TAGGING AND IDENTIFYING ASPHALT ADDITIVES

[75] Inventors: Walter A. Richardson, III, Beverly, Mass.; Alejandro Zimin, Sr., Wayne, N.J.; James Fuerholzer, Crystal Lake, Ill.; Michael R. Friswell, Wayne, N.J.; Michael P. Hinton, Neshanic Station, N.J.; Peter A. Caputo, South Orange, N.J.

[73] Assignee: Morton International, Inc., Chicago, Ill.

[21] Appl. No.: 53,256

[22] Filed: Apr. 26, 1993

[51] Int. Cl.⁵ ............................................. C04B 24/02
[52] U.S. Cl. ............................. 106/668; 106/273.1; 106/275; 106/281.1; 106/622; 106/712; 106/823; 106/DIG. 7; 524/61; 524/64; 252/393; 260/998.19
[58] Field of Search ............... 106/668, 622, 821, 822, 106/823, DIG. 7, 712, 273.1, 274, 275, 277, 281.1, 284, 713, 726, 727, 792, 795; 524/61, 64; 544/165; 252/389.21, 394, 393, 389.1, 389.32

[56] References Cited
U.S. PATENT DOCUMENTS

| | | | |
|---|---|---|---|
| 2,386,867 | 10/1945 | Johnson | 106/DIG. 7 |
| 4,209,302 | 6/1980 | Orelup | 44/59 |
| 4,430,127 | 2/1984 | Dalter et al. | 106/273 N |
| 4,639,273 | 1/1987 | Gilmore et al. | 106/281 N |
| 4,743,304 | 5/1988 | Gilmore et al. | 106/281 N |
| 4,775,419 | 10/1988 | Gilmore et al. | 106/281.1 |
| 5,037,474 | 8/1991 | Mesch et al. | 106/273.1 |

*Primary Examiner*—Mark L. Bell
*Assistant Examiner*—Paul Marcantoni
*Attorney, Agent, or Firm*—Wayne E. Nacker; Gerald K. White

[57] ABSTRACT

A tag is added to an asphalt additive, typically an anti-stripping agent. The additive dye is mixed with other components of an asphalt composition and melt processed at 300° F. (149° C.) or above to produce an asphalt composition. Presence of the tag to identify presence of the additive is performed by dissolving the asphalt portion of the composition in a water-immiscible solvent and then extracting the tag in an acidic aqueous solution and developing a color with a diazo compound.

7 Claims, No Drawings

TAGGING AND IDENTIFYING ASPHALT ADDITIVES

The present invention is directed to tagging asphalt additives, particularly anti-stripping agents, but also lime and fillers.

BACKGROUND OF THE INVENTION

Asphalt compositions, such as asphalt concrete used for paving roadways or asphalt roofing compositions, comprise an asphalt cement and aggregate. The aggregate is typically natural or synthetic sand and gravel of various sieve sizes or specified meshes. The asphalt may be of a variety of grades, for example, harder grades of asphalt will be used for pavement applications in warmer climates while softer grades of asphalt will be used for pavement applications in colder climates. The asphalt may be modified by inclusion of polymeric materials, such as rubber or latex. Likewise, the mesh distribution and type of aggregate may vary widely, depending upon the application. In asphalt concrete used for paving, the aggregate is by far the major portion, typically comprising about 95 weight percent with the asphalt portion typically comprising the remaining 5 weight percent.

As described in U.S. Pat. Nos. 4,775,419, 4,430,127, 4,639,273, 4,743,304 and 5,037,474, the teachings of each of which are incorporated herein by reference, a major limitation to durability of asphalt compositions is the strength of the bond between the asphalt portion and the aggregate, a bond which is weakened by water, either water initially present in the aggregate or water to which the asphalt composition is subsequently exposed. Accordingly, as taught by the above-referenced patents, an anti-stripping agent is incorporated into the asphalt portion. The anti-stripping agent is typically an organic polyamine, e.g., U.S. Pat. No. 4,430,127, but may be a variety of other compounds or mixtures of compounds. U.S. Pat. No. 4,775,419 teaches the use of metal amine complexes. U.S. Pat. No. 4,430,127 teaches epoxylated polyamines. U.S. Pat. 4,639,273 teaches formaldehyde adducts of amines, polyamines and amides. U.S. Pat. No. 4,743,304 teaches the use of imadazolines, polyamines, alkoxylated polyamines, aminocarboxylic esters, amide-amines and mixtures thereof. U.S. Pat. No. 5,037,474 teaches using the reaction product of an epoxy compound with either phosphoric acid or a partial ester of phosphoric acid. Other materials, such as lime added to the aggregate, or fillers, such as cellulose or portland cement, may also be added to increase the strength and durability of the asphalt composition.

The lifetime of an asphalt composition is heavily dependent upon the additives added, particularly anti-stripping agent, but also lime and fillers. Accordingly, contracts, such as state paving contracts, will typically specify the amount and type of additives to be used. Unfortunately, there is no particularly good way to determine the content of anti-stripping agent and other additives once the components of the asphalt compositions are blended together. Additives, such as anti-stripping agent comprise only a very minor proportion of the asphalt concrete. Anti-stripping agent typically comprises between about 0.2 and about 5.0 wt. percent of the asphalt portion, which, in turn comprises about 54 of the asphalt concrete. Although additives are minor components, on a cost per pound basis they are generally considerably more costly than either the aggregate or asphalt itself. Honest mistakes are made in mixing components of an asphalt composition. Unfortunately, there is an economic incentive for a potentially dishonest contractor to reduce or eliminate anti-stripping agent or other additives from the paving composition or to use a cheaper grade of anti-stripping agent than specified by the contract. The temptation to cheat in this regard is increased by the lack of efficient test methods for determining the amount of additives. Even without a pre-intent to defraud, contractors have been known to continue paving operations after running out of additives so as to avoid work stoppages.

It would be desirable for the specifying party, such as the state or ministry, contracting for asphalt paving, to have a way of monitoring the level of additives actually used to ensure compliance with the terms of the contract. This might be done by sampling the mix while the asphalt portion is still hot or sampling the hardened asphalt concrete (hot mix asphalt), either at the time the roadway is paved, or at a subsequent time should testing be warranted or necessary.

Most efforts in measuring anti-stripping agents have centered on chemical analysis. Efforts to date have produced tests which are cumbersome to perform, poorly quantitative, and generally incapable of distinguishing between anti-stripping agents of various qualities. The present invention is directed to tagging asphalt additives and identifying the tagged additive in the asphalt.

SUMMARY OF THE INVENTION

In accordance with the invention, a tag of specific formulae is added to an asphalt additive. The mixture of materials which are used to form the asphalt composition are processed in the usual manner, e.g. at temperatures of about 300° F. (149° C.) and upward and subsequently allowed to cool to form the hardened asphalt composition. A sample is taken of either the hot mixture or the hardened asphalt composition and the asphalt portion is dissolved in a suitable solvent. The tag is extracted in acidic aqueous solution and a strong color is produced by reacting the tag with a diazo compound.

DETAILED DESCRIPTION OF CERTAIN PREFERRED EMBODIMENTS

For purposes of this application, the following terms are defined as follows:

"Asphalt" shall be broadly interpreted to include not only true asphalt, but other related bituminous materials, such as coal tar, used in paving, roofing or the like.

"Asphalt composition" shall be any asphalt-containing composition, including compositions containing aggregate or other insolubles and compositions not containing aggregate or other insolubles.

"Asphalt concrete" shall be any asphalt composition containing aggregate or other insolubles.

"Asphalt portion" shall be that portion of any asphalt composition which includes asphalt and any asphalt-miscible material, including anti-stripping agent and tag.

The tags useful in the process of the present invention are compounds described in U.S. Pat. No. 4,209,302 to Richard Orelup, the teachings of which are incorporated herein by reference. Specifically, the tags are compounds of the formulae:

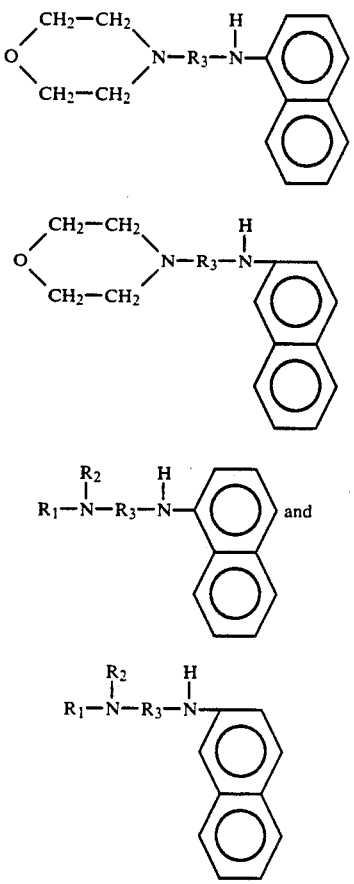

where $R_1$ and $R_2$ are hydrogen or alkyl having from one to twenty carbon atoms and $R_3$ is an alkyl group of from one to eight carbon atoms. As described in U.S. Pat. No. 4,209,302, such compounds have been previously utilized as petroleum markers. Markers used to tag petroleum are almost invariably added to refined petroleum products which are generally never exposed to temperatures significantly above ambient temperatures. On the other hand, any marker for an asphalt additive must be exposed to the high temperatures at which asphalt compositions are heat processed. Because of this, most petroleum markers are unsuitable for tagging asphalt, being unstable at asphalt processing temperatures, i.e., about 300° F. (149° C.) and above and generally about 350° F. (177° C.) and above. All or a substantial portion of most petroleum markers is destroyed during asphalt composition processing. It is found, however, that the compounds useful in the process of the present invention are stable to asphalt processing temperatures and are detectable in asphalt compositions in place for extended periods (during which oxidation of asphalt occurs).

It is further surprising that an asphalt composition containing a tag in accordance with the present invention and a polyamine anti-stripping agent can be distinguished from the same composition without the tag. The tags of the present invention are similar in chemistry to polyamine anti-stripping agents, the tags having two amine groups. However, a test of a non-tagged asphalt composition produces no color while a test of the tagged composition produces a strong color. The test is generally quantitative, as tests have shown that the amount of tag added to asphalt can be detected to within 10%. A relatively quantitative test is useful to determine that not only was the correct additive added, but the correct amount of the additive was added.

The additive expected to be the most commonly tagged additive is the organic anti-stripping agent. However, the tag can be used in any additive, such as lime or in fillers, such as portland cement or cellulose. Typical use levels, relative to weight of aggregate for lime is 1 to 2 wt. %, for portland cement 0.5 to 3 wt. % and for cellulose up to 10 wt. %. A state, for example, may periodically change the additive which is tagged to spot check that a contractor is using each of the components in the specified amount. As all of the tags of the above formulae are extracted and color developed in a similar manner, generally, only one additive is tagged and detected. However, it is possible that two different tags of the general formulae above can be used to tag two different additives, provided they develop colors with different absorbency peaks which can be separated spectrophotometrically.

Tags according to the above formulae can be extracted and color-developed from solutions containing as low as 0.5 parts per million (ppm) (weight/volume) tag. In the method of the present invention, the solution from which the tag is extracted and color-developed is the solution of asphalt portion-insolvent. Accordingly, the amount of tag added to the additive will be calculated to achieve a desired concentration of tag in the asphalt portion-insolvent solution. Although the tag can be detected at a 0.5 (ppm) (weight/volume) level, it is preferred that sufficient tag be present so that the asphalt portion-in-solvent solution contains tag at a level of at least about 10 ppm. This will give a somewhat more quantitative test, and will enable detection and quantifying should the required additive be used, but at a level below that specified. In anti-stripping agents, the tag is typically used at between about 0.5 and about 5% by weight, preferably 1-2% by weight. The anti-stripping agent is typically used at between about 0.2 and about 5 percent by weight of the asphalt portion. For testing, solvent at a volume level of at least about three times the volume level of the asphalt portion is used to dissolve the asphalt portion. For efficiency and better color development, the volume of solvent is seldom more than about 10 times the volume of the asphalt portion. If the tag is added to lime or fillers, the amount of marker can be calculated relative to the use level of the additive and the desired tag level in the asphalt portion-in-solvent solution.

Tags of the present invention do not extract directly from the asphalt portion; thus the need to reduce the asphalt portion in solvent. Suitable solvents are those which readily dissolve asphalt portion and are also water-immiscible. Suitable solvents include toluene, citrus solvents, xylene, kerosene, 1,1,1 trichloroethane, trichloroethylene and mixtures thereof.

Evidence of the tag may be found in either a freshly mixed asphalt composition sample or a cooled, solidified composition. If testing of a hot mix is desired, a volume of the composition is obtained and generally allowed to cool, at least to below the boiling point of the solvent in which the specimen is to be reduced. The volume of asphalt composition to be tested will take into account that most of the asphalt composition will be aggregate and that only the asphalt portion will be dissolved in the solvent. The volume of solvent added is then calculated to take into account the calculated amount of asphalt portion in the asphalt composition. For the most accurate measurement of additive level, the volume of residue aggregate and other insolubles will be subsequently determined after the asphalt portion is dissolved in the solvent.

The tag is then extracted in acidic aqueous solution and color-developed with a diazo compound. Preferably, the pH of the extracting solution is about 4 or below. The volume of acidic aqueous solution is sufficient to extract substantially all of the tag, but preferably as small as is needed so as to concentrate the tag and produce the strongest color. Typically, the ratio of the volume of the extractant to the volume of the asphalt portion-insolvent solution is between about 1:10 and about 1.1, although any ratio may be used, provided the developed color is detectable. The tags used in the process of the present invention may be extracted by an acetic acid/water solution or a solution of other acids, such as propionic acid, HCl or methane sulfonic acid. For good separation of the aqueous phase from the solvent phase, a minor amount of an anti-emulsifying agent may be added.

The acidic aqueous extractant may contain the diazo compound necessary for color development or the diazo compound may be added in a separate development step. The diazo compound may be any compound which diazotizes the naphthalene ring of the tag. The diazo compound is provided in stoichiometric excess of any tag which might be present in the asphalt composition. For convenience of providing test materials with predictable results in the field, it is preferred to use a stabilized diazo compound. Examples of suitable diazo compounds, include, but are not limited to 2-chlor-4-nitroaniline, 2-chlor-aniline, 4-chlor-aniline and 2-nitro-aniline.

The mere fact of color development upon addition of the diazo compound is a qualitative test for the presence of the tag and therefore the specified additive. For quantitative testing, spectrophotometric measurements of the color developed is required. The amount of the specified additive can be readily calculated from knowledge of the concentration of tag in the additive, the volume of asphalt portion in the asphalt composition, the volume of solvent used to dissolve the asphalt portion and the volume of extractant/developer solution.

The invention will now be described in greater detail by way of specific examples.

EXAMPLE 1

To show the feasibility of tagging asphalt additives and detecting the tag in asphalt compositions, the following experiment was performed. A tag in accordance with the invention, 3.3 wt. % of 1-(4-morpholino)-3-(alpha naphthylamino)propane was added to 96.7% of an anti-stripping agent which is a mixture of polyamines and sold under the trademark of Pave Bond Lite. 99 parts of AC-20 asphalt was heated to 300° F. (149° C.) and one part of the tagged anti-stripping agent. The asphalt composition was then cooled to room temperature. 5 parts by volume of the asphalt composition was reduced with 95 parts by volume xylene. In a 125 ml. separatory funnel, 20 cc of the asphalt-in-xylene solution was poured. Then, 10 cc of an aqueous solution of 20 parts ammonium chloride, 20 parts propionic acid was added and the mixture was mixed for two minutes. 0.1 ml. of an anti-emulsifying agent (Petrotec® 7400) was added, and the mixture was let stand for 5 minutes. The lower aqueous phase was drawn off into a 50 ml. graduated cylinder. To the aqueous phase was added 0.1 ml. of alpha-chlor-aniline, and the solution was shaken gently. A bright bluish-red color indicated the presence of the tag.

EXAMPLE 2

A compacted asphalt concrete was formed containing:

94.1% aggregate
5.8705% asphalt cement
0.0292% PAVE BOND LITE*
0.0003% of the tag of Example 1

* a polyamine anti-stripping agent sold by Morton International, Inc.

The compacted asphalt concrete was warmed at 175° F. (80° C.) until soft. 100 g of the soft asphalt concrete was placed into a 1 liter beaker. 45 ml. Biogenic Electrosafe was added and warmed with stirring until the asphalt concrete was dissolved (about 30 Min). The solution was decanted over a gravity filter. Then the remaining aggregate was washed with 65 ml. Biogenic Electrosafe over the filter. The filtrate was transferred to a 100 ml. separatory funnel. 45 ml. of Extractant A20* was added and folded gently and allowed to separate. The clear lower aqueous phase was let-off and a solution of nitro-chlor-aniline in acetic and sulfuric acids. A pale pink color developed.

** a non-chlorinated solvent containing d-Limonene and petroleum distillates from Rochester Midland
*** 50 g. ammonium chloride, 50 g acetic acid, 100 ml. water While the invention has been described in terms of certain preferred embodiments, modifications obvious to one with ordinary skill in the art may be made without departing from the scope of the invention.

Various features of the invention are set forth in the following claims.

What is claimed is:

1. A method of determining the presence of an additive in an asphalt composition, the method comprising, tagging said additive with a tag selected from a compound of the formulae:

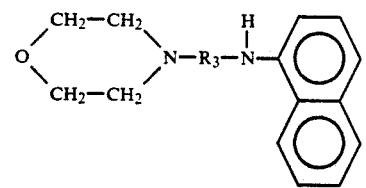

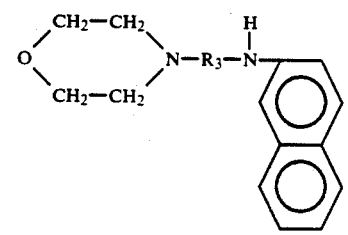

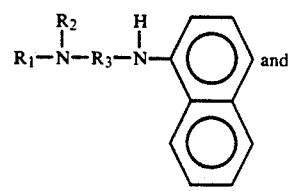 and

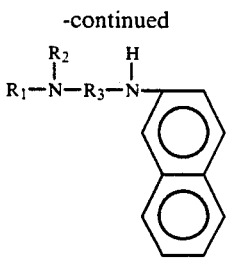

where $R_1$ and $R_2$ are hydrogen or alkyl having from one to twenty carbon atoms and $R_3$ is an alkyl group of from one to eight carbon atoms, mixing said tagged additive with asphalt and other components of an asphalt composition to form a mixture, an asphalt portion component of said mixture comprising said asphalt and any asphalt-soluble component, including said tag, and processing said mixture at temperatures of about 300° F. (149° C.) or above to form the asphalt composition, obtaining a specimen of said asphalt composition, dissolving the asphalt portion of said a specimen in a water-immiscible solvent to form an asphalt portion-insolvent solution, and concurrently or successively extracting tag from said asphalt portion-insolvent solution and developing a color by reacting said tag with a diazo compound.

2. The method of claim 1 wherein said additive is an anti-stripping agent.

3. The method of claim 2 wherein said anti-stripping agent comprises polyamines.

4. The method of claim 1 wherein said additive is lime.

5. The method of claim 1 wherein said additive is a filler.

6. The method of claim 5 wherein said filler is Portland cement.

7. The method of claim 5 wherein said additive is cellulose.

* * * * *